US008316307B2

(12) United States Patent  (10) Patent No.: US 8,316,307 B2
Walter et al.  (45) Date of Patent: Nov. 20, 2012

(54) METHOD AND APPARATUS FOR ABSTRACTING INTERNET CONTENT

(75) Inventors: Edward Walter, Boerne, TX (US); Larry B. Pearson, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 891 days.

(21) Appl. No.: 11/549,420

(22) Filed: Oct. 13, 2006

(65) Prior Publication Data

US 2008/0092056 A1  Apr. 17, 2008

(51) Int. Cl.
  *G06F 3/00* (2006.01)
(52) U.S. Cl. .................................................. 715/739
(58) Field of Classification Search .............. 715/738, 715/739, 745, 744, 747, 734, 735, 736, 771
  See application file for complete search history.

(56) References Cited

U.S. PATENT DOCUMENTS

| 5,918,236 A | 6/1999 | Wical |
| 5,959,621 A * | 9/1999 | Nawaz et al. ................ 715/733 |
| 6,216,141 B1 * | 4/2001 | Straub et al. ................ 715/234 |
| 7,068,189 B2 * | 6/2006 | Brescia ..................... 340/995.1 |
| 2004/0165007 A1 | 8/2004 | Shafron |
| 2005/0132016 A1 * | 6/2005 | Boone ........................ 709/207 |
| 2007/0216535 A1 * | 9/2007 | Carrino ..................... 340/573.1 |

FOREIGN PATENT DOCUMENTS

| EP | 1538536 | 6/2005 |
| WO | 02065318 | 8/2002 |

\* cited by examiner

*Primary Examiner* — Thanh Vu
(74) *Attorney, Agent, or Firm* — Guntin Meles & Gust, PLC; Andrew Gust

(57) ABSTRACT

A method and apparatus for abstracting Internet content is disclosed. An apparatus that incorporates teachings of the present disclosure may include, for example, a terminal device having a User Interface (UI) element that links a Graphical User Interface (GUI) element to each Internet resource identifier (IRI) of one or more subject matters of interest defined in a profile by an end user, and presents said one or more GUI elements in a GUI window without association to an Internet browser. Additional embodiments are disclosed.

20 Claims, 5 Drawing Sheets

Roller Ball

METHOD AND APPARATUS FOR ABSTRACTING INTERNET CONTENT

FIELD OF THE DISCLOSURE

The present disclosure relates generally to abstraction techniques and more specifically to a method and apparatus for abstracting Internet content.

BACKGROUND

Browsing the Internet for content is a common activity performed by millions of consumers with Internet access. Internet browsers support bookmarking of websites to accommodate repetitive use of certain websites by an end user. Typically, end users have a tendency to forget which websites have been bookmarked and which have yet to be bookmarked as the number of bookmarks created by said end user grows. Consequently, users can inadvertently repeat the bookmarking process for a website that has already been bookmarked, or they may inconveniently spend time searching through bookmark folders to find a bookmark of interest.

A need therefore arises for a method and apparatus for abstracting Internet content.

DETAILED DESCRIPTION

Embodiments in accordance with the present disclosure provide a method and apparatus for abstracting Internet content.

In a first embodiment of the present disclosure, a computer-readable storage medium in a terminal device can have computer instructions for establishing a profile of one or more subject matters of interest each associated with a corresponding Internet resource identifier (IRI), linking a Graphical User Interface (GUI) element to each IRI of the one or more subject matters of interest, and presenting the one or more GUI elements in a GUI window without association to an Internet browser.

In a second embodiment of the present disclosure, a terminal device can have a User Interface (UI) element that links a Graphical User Interface (GUI) element to each Uniform Resource Identifier (URI) of one or more subject matters of interest defined in a profile by an end user, and presents said one or more GUI elements in a GUI window without association to an Internet browser.

In a third embodiment of the present disclosure, a method in a terminal device can have the step of presenting an end user of the terminal device a profile with a plurality of subject matters of interest without access to corresponding predefined Uniform Resource Locators (URLs), establishing in the profile one or more subject matters of interest selected by the end user from the plurality of subject matters of interest, linking a Graphical User Interface (GUI) element to each predefined URL of the one or more subject matters of interest selected, and presenting said one or more GUI elements in a GUI window without association to an Internet browser.

Figure 1:
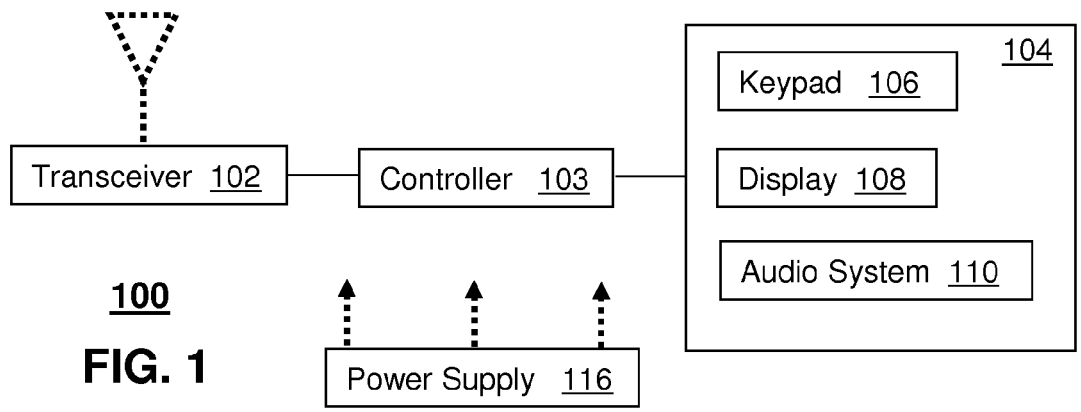
FIG. 1 depicts an exemplary embodiment of a terminal device.

FIG. 1 depicts an exemplary embodiment of a terminal device 100. The terminal device 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on.

Singly or in combination with the wireline technology, the transceiver 102 can support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1x, W-CDMA/HSDPA, GSM/GPRS, TDMA/EDGE, and EVDO. SDR can be utilized for accessing public and private communication spectrum with any number of communication protocols that can be dynamically downloaded over-the-air to the terminal device 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the terminal device 100. The UI element 104 can further include a display 108 such as monochrome or color LCD (Liquid Crystal Display) which can be touch sensitive for manipulating operations of the terminal device 100 and for conveying images to the end user of said device, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the terminal device 100 and to facilitate portable applications. Depending on the type of power supply 116 used, the terminal device 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the terminal device 100.

The terminal device 100 can further represent a single operational device or a family of devices configured in a master-slave arrangement. In the latter embodiment, the components of the terminal device 100 can be reused in different form factors for the master and slave terminal devices.

Figure 2:
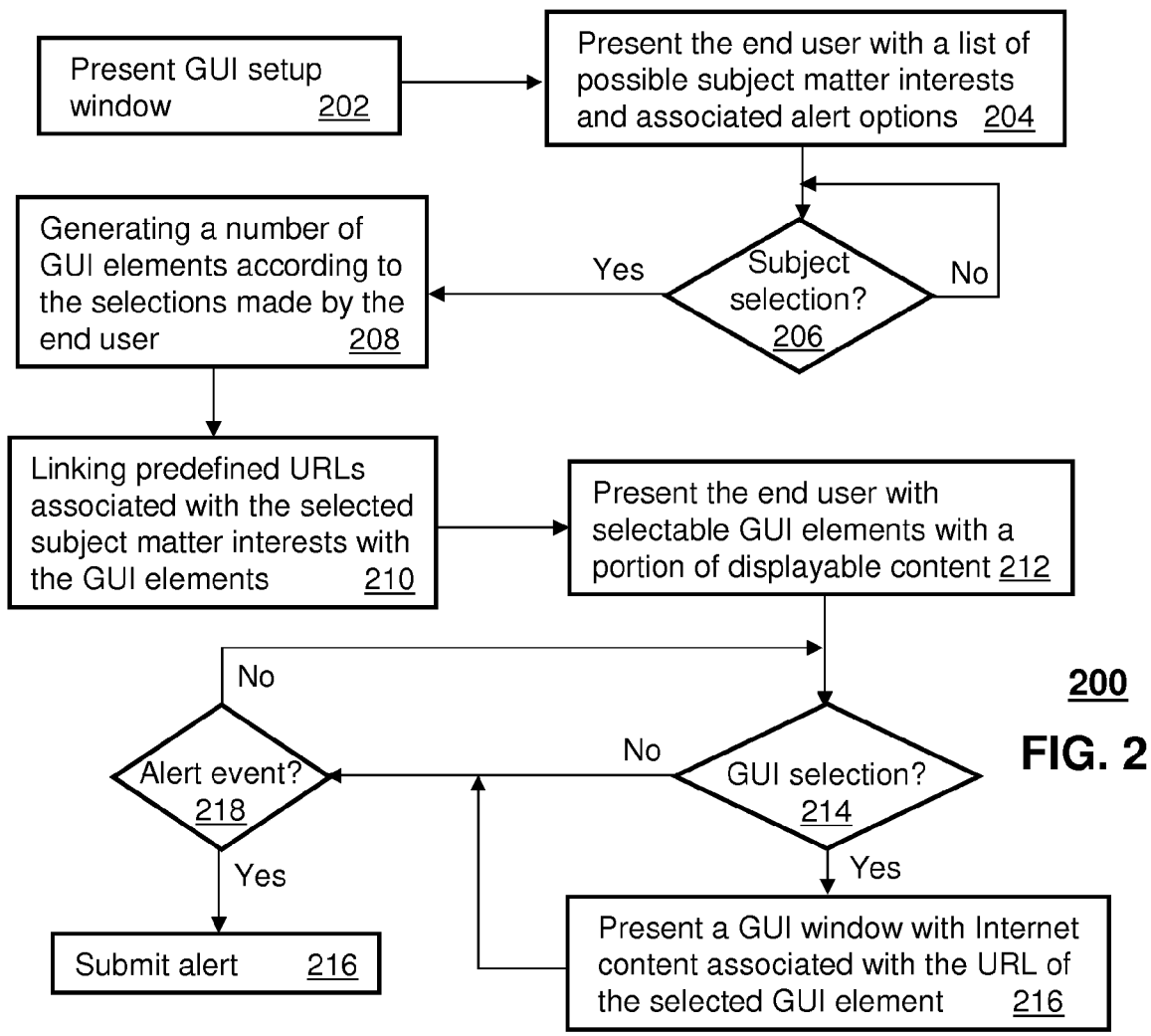
FIG. 2 depicts an exemplary method operating in the terminal device.
Figure 3:
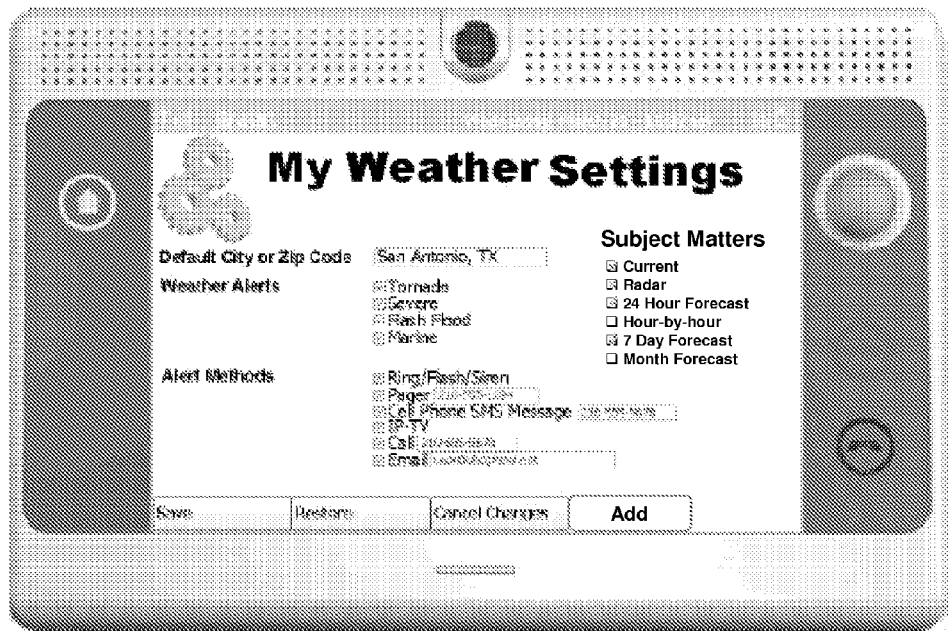
FIGS. 3-8 depict exemplary embodiments of the terminal device for abstracting Internet content.

FIG. 2 depicts an exemplary embodiment of a method 200 operating in the terminal device 100. Method 200 begins with step 202 in which the terminal device 100 is programmed to present the end user of said device a setup GUI window such as depicted in FIG. 3 to profile the subject matters of interest of the end user. In this GUI window, the end user is presented in step 204 with a selection of possible subject matters of interest associated with weather, weather alerts, and a corresponding set of alerting methods. A setup GUI window for other subject matters can also be presented such as, for example, subject matters relating to sports, news, finances, business, health, entertainment, education, politics, law, science, or technology—just to name a few. The illustrations that follow in FIGS. 4-8 relate exclusively to the subject matter of weather. It would be evident to an artisan of ordinary skill in the art that other subject matters of interest can be applied to the present disclosure.

Figure 4:

Referring back to step 204, the terminal device 100 can be programmed to invoke the "My Weather Settings" GUI window of FIG. 3 by selecting a "My Weather" GUI button under the "My Settings" GUI category shown in FIG. 4. Although not shown in the "My Settings" GUI category, said GUI category could have other GUI buttons such as "My News", "My Sports", and so on, which the end user can configure profiles in a similar fashion to the "My Weather Settings" GUI window of FIG. 3.

Focus on the subject matter of weather, the setup GUI window of FIG. 3 presents the end user with a location field in which a city, state and/or zip code can be entered. In step 204, the terminal device 100 can use this information to select from a large collection of possible subject matters of interest a subset of said interests and corresponding alert options that may be useful to the end user in his/her area. Thus, in the illustration of FIG. 3 the end user is presented with selectable subject matters, alerts, and alert methods that s/he can choose from which may be pertinent to the user in the San Antonio, Tex. area.

In step 206 the terminal device 100 can be programmed to monitor a selection by the end user from the subject matters and corresponding alerts and methods to alert. The user in this example has selected as depicted by check marks in the check boxes under "Subject Matters" the subjects: "Current" (which represents current weather conditions), "Radar", "24 Hour Forecast", and 7 Day Forecast" all of which are localized to the San Antonio, Tex. area. Additionally, the end user has selected "Alerts" for tornados, severe weather, flash floods, and marine warnings. The end user has further selected as alert methods an audible ring, flash or siren alert to be emanated from the terminal device 100, and/or an alert message submitted to his pager, cell phone, IP-TV, calling number (e.g., office number), or device capable of receiving emails.

Upon detecting a final selection of the subject matters and alerts (such as by depressing the "Save" GUI button shown in FIG. 3), the terminal device 100 proceeds to step 208 where it generates one or more GUI elements corresponding to the selections made by the end user. In this illustration, the GUI elements generated are a GUI button for each of the subject matters "Current", "Radar", "24 Hour Forecast", and 7 Day Forecast." Each of these subject matters can have a predefined Internet resource identifier (IRI) stored in the terminal device 100 for extracting Internet content in relation to the type of subject matter selected. A service provider of a communication system from which the terminal device 100 operates can provide Internet service for weather information associated with the IRIs discussed above. Alternatively, the service provider can broker services from content providers (e.g., weather.com or the weather channel) to support services for these subject matters.

An IRI can comprise at least one among a domain name (e.g., hostname.domainname.com), the domain name and a corresponding port number (e.g., hostname.domainname.com, 80), an IP address (e.g., 151.164.1.100), or the IP address and a corresponding port number (e.g., 151.164.1.100, 80)-just to mention a few embodiments. The IRI can operate according to any present or future access protocol (e.g., Hyper Text Transfer Protocol or HTTP). The IRI can also be defined as a Uniform Resource Identifier (URI) or Uniform Resource Locator (URL). The IRI can also comprise a tElephone NUmber Mapping (ENUM) identifier. In sum, the IRI can consist of any present or future means for identifying a resource on any packet-switched network. For illustration purposes only, the discussions below will focus on the use of URLs. It should be understood, however, that the URLs can be replaced with any embodiment of the IRI as described herein.

To remove the complexity for the user to enter URLs for the aforementioned subject "Current", "Radar", "24 Hour Forecast", and 7 Day Forecast," the URL for each subject matter can be preprogrammed in the terminal device 100 and is not made visible or accessible to the end user in the setup GUI window of FIG. 3. Alternatively or in combination, the end user can enter additional subject matters by selecting the "Add" GUI button shown in FIG. 3 and entering a name for the new subject matter and a corresponding URL. In this use case, step 208 would also generate a GUI element for the new subject matter if selected in step 206 by the end user.

Once the GUI elements described in step 208 have been generated, the terminal device 100 proceeds to step 210 where it links said predefined URLs (and any URLs entered by the end user) to said GUI elements. The terminal device 100 presents in step 212 these GUI elements as shown in FIG. 4 in the "My Weather" GUI category. The terminal device 100 can be programmed in step 212 to further display a portion of the Internet content associated with one or more of said GUI elements as a preview. For example, in the GUI button depicted as "Current" a current temperature of 79 degrees with winds out of the South at 12 miles per hour is previewed. The "Radar" GUI element can present a miniaturized snapshot or active radar also. In cases where there may be too much information to preview, the GUI elements can present a picture image or just text as depicted by the "24 Hour Forecast" and "7-Day Forecast" GUI elements.

The presentation of these GUI elements in step 212 is performed without a common Internet browser. Consequently, these GUI elements have no association with bookmarks commonly used by prior art Internet browsers. By linking the URLs to said GUI elements, the end user can trigger access to Internet content by selecting a GUI element without opening an Internet browser and selecting a bookmark as is commonly done today. The Internet content associated with the URL of a selected GUI element can be retrieved and presented utilizing common techniques.

Thus, once the GUI elements have been presented in step 212, the terminal device 100 proceeds to step 214 where it monitors for a GUI selection by the end user. A selection can be performed with a stylus or finger manipulation on a touchscreen display 108, or a roller ball can be used to scroll between GUI elements and thereby direct a selection a GUI element by depressing said roller ball. If a selection is detected, the terminal device 100 proceeds to step 216 where it presents a GUI window with Internet content associated with the URL of the selected GUI element. For example, a selection of the "Current" GUI element can result in the GUI window of FIG. 5 with the related current weather content and with a presentation of the other unselected GUI elements in the event the user wants to view additional subject matter such as "Radar". FIGS. 6 and 7 demonstrate GUI windows in response to a selection of the "Radar" and "24 Hour Forecast", respectively. FIG. 8 shows similar presentations to the ones shown in FIGS. 4-7 in terminal device 100 having a handset form factor.

During the presentation of the GUI window in step 216, or if no GUI selection was detected in step 214, the terminal device 100 can proceed to step 218 where it monitors the alerts selected in step 206 as shown in FIG. 3. In this step, the terminal device 100 monitors alert signals submitted by a third party source over an IP connection. The alert signal can be submitted, for example, by a third party system managing the content associated with the URL. Alternatively, the alert signal can be sourced by a local or national weather center which submits this information to the Internet weather content server managing the URL of interest. Alerts monitored can include tornados, severe weather warnings, flash floods, and so forth.

The alert signal can be transmitted as a unicast or multicast IP signal, which is monitored by the terminal device 100 in step 218. If no alert event is detected, the terminal device 100 proceeds to step 214 where it continues to monitor for GUI selections. If one or more alert events are detected that are associated with the selections made by the end user in step 206, the terminal device 100 proceeds to step 216 where it submits an alert to the end user.

The alert signal can be directed to the terminal device 100 such as by way of an audible alert, flashing lights, and/or a modification to the GUI element (e.g., changing the color of the GUI element, flashing GUI button, text alert superimposed on the GUI button, etc.). Alternatively, or in combination the terminal device 100 can submit an alert message to a communication device of the end user such as a pager, cell phone, multimedia device such as an IP-TV, a computing device (e.g., a laptop, PDA, or cell phone), or a conventional PSTN phone—just to mention a view.

Figure 5:
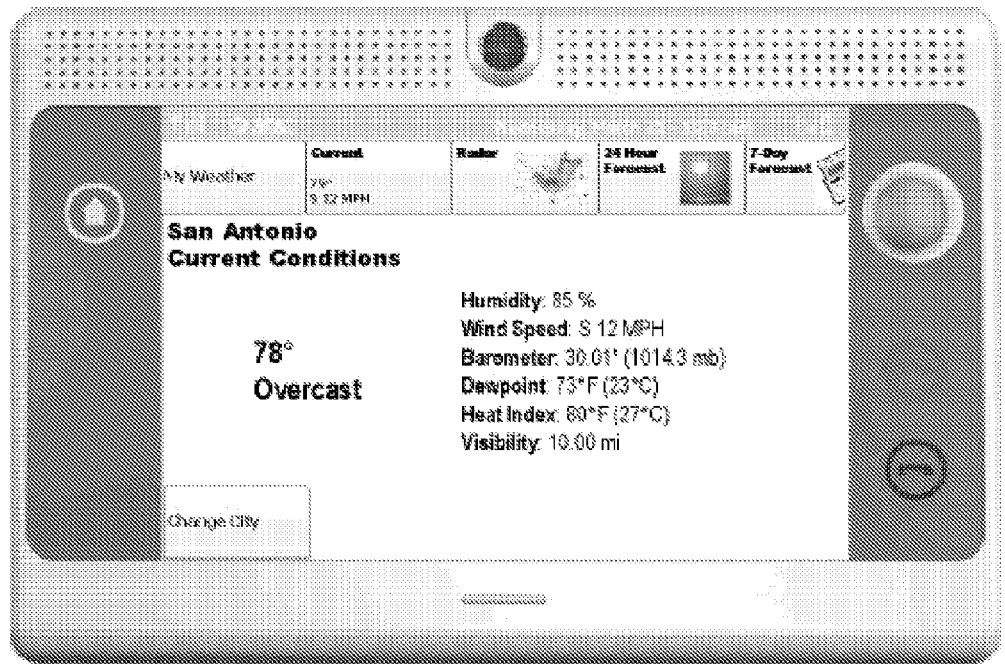
Figure 6:
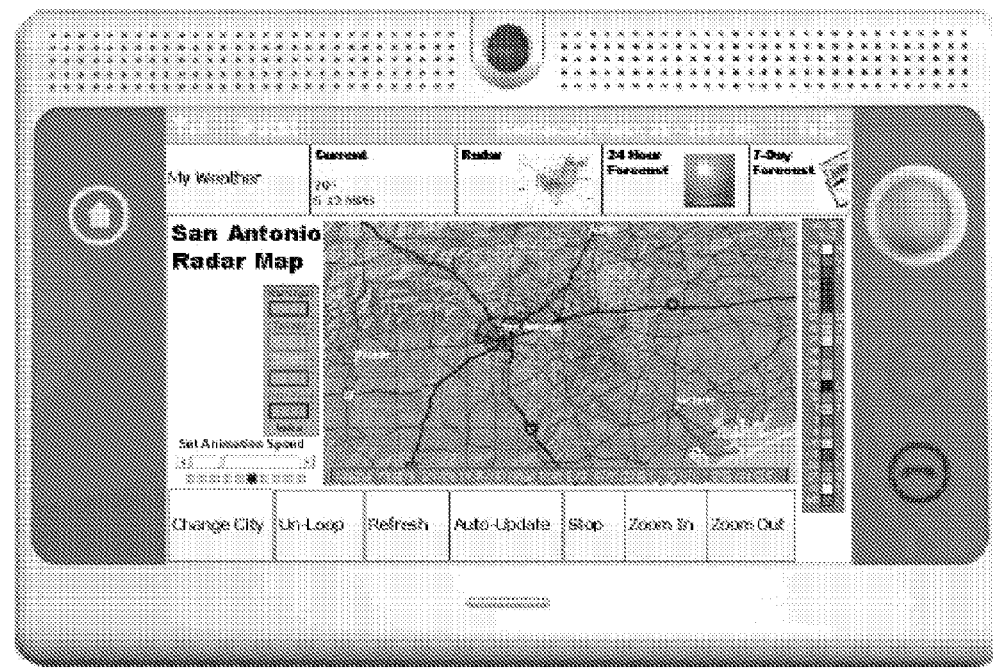
Figure 7:
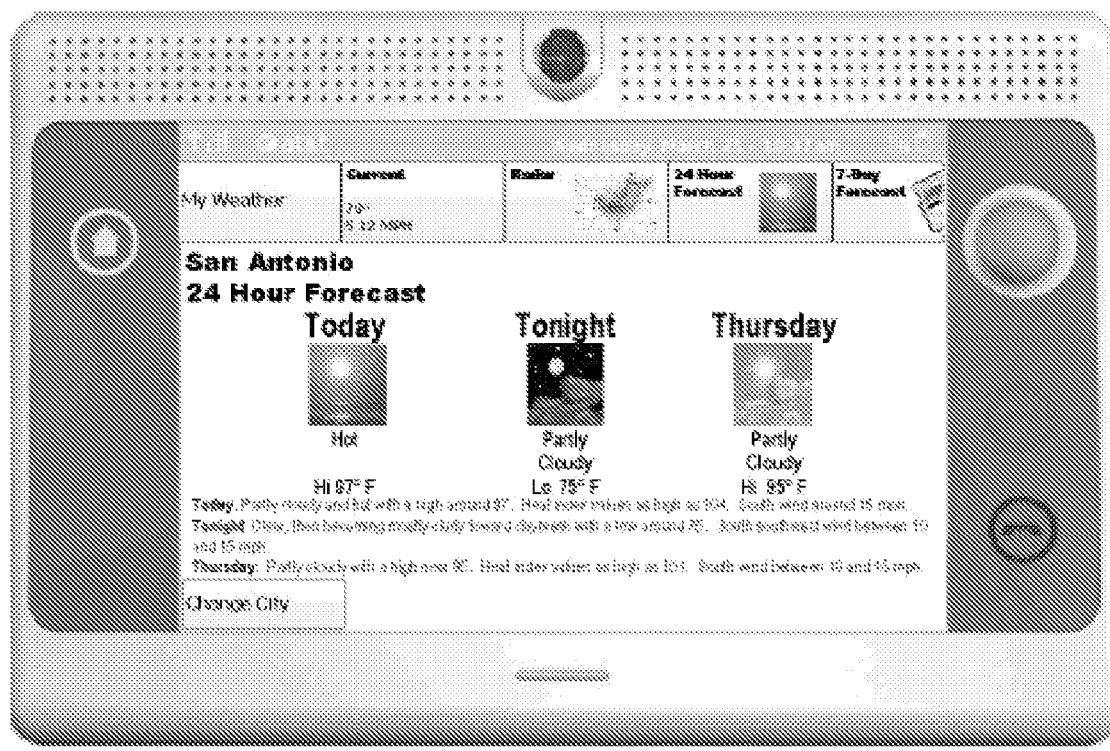
Figure 8:

The alert message can be an alphanumeric page directed to a pager, a text message such as a Short Message Service (SMS) message, a synthesized voice message indicating the type of alert directed to a cell phone or other communication device, a multimedia message with text and graphics more or less like the illustrations of FIGS. 5-7 depending on the presentation capabilities of the media device receiving said alert, or an email message to one of said devices. Additionally, the alerts can be prioritized so that depending on the severity of the alert one or more of the selected alert methods is chosen by the terminal device 100 rather than all.

Upon reviewing the foregoing embodiments, it would be evident to an artisan with ordinary skill in the art that said embodiments can be modified, reduced, or enhanced without departing from the scope and spirit of the claims described below. There are for instance innumerable viewable Internet content sources that an end user can profile and develop therefrom abstracted selectable GUI elements according to the present disclosure. It would be therefore evident to said artisan that many modifications can be made to the present disclosure without departing from the scope of the claims stated below. Accordingly, the reader is directed to the claims section for a fuller understanding of the breadth and scope of the present disclosure.

Figure 9:
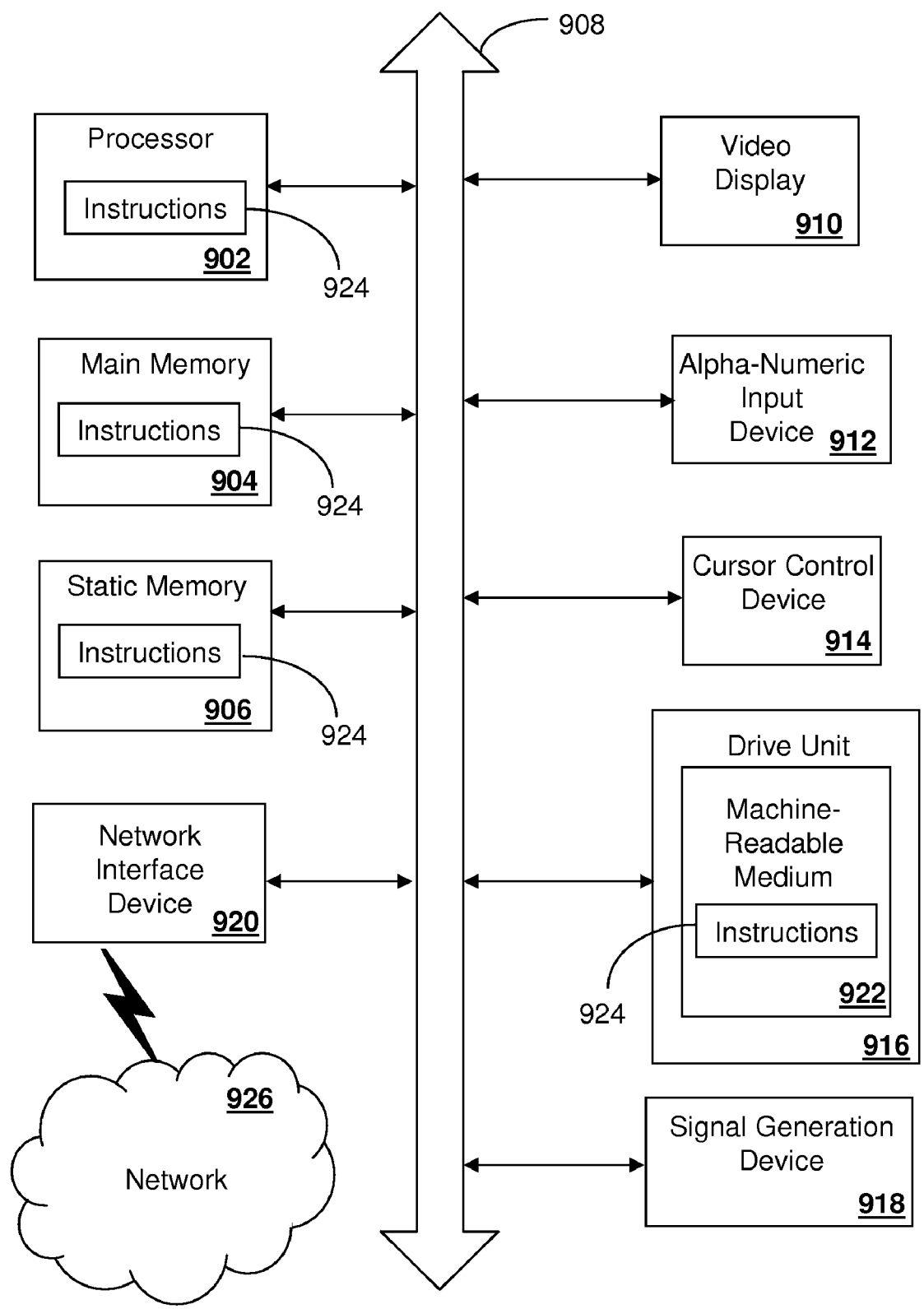
FIG. 9 depicts an exemplary diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium in a terminal device, comprising computer instructions to:
   present a group of subject matters of interest without identifying content providers associated with the group of subject matters of interest, wherein the subject matters of interest include a subject identifier;
   establish a profile based on a selection of one or more subject matters of interest from the group of subject matters of interest, each of the selected one or more subject matters of interest being associated with a corresponding Internet resource identifier (IRI) by the terminal device;
   link a Graphical User Interface (GUI) element to each IRI of the selected one or more subject matters of interest; and
   present the one or more GUI elements in a GUI window without association to an Internet browser.

2. The storage medium of claim 1, comprising computer instructions to present the one or more GUI elements without identifying the corresponding IRI and without identifying a corresponding content provider.

3. The storage medium of claim 2, wherein each of the corresponding content providers is determined based on a pre-existing agreement to provide content for at least a portion of subject matters of interest from the group of subject matters of interest, wherein the pre-existing agreement is between the corresponding content provider and a communication service provider of the terminal device.

4. The storage medium of claim 3, comprising computer instructions to:
   present a location field with the profile;
   identify location data supplied by the end user in the location field; and
   select at least one among the plurality of subject matters of interest and the one or more alert options according to the location data supplied by the end user.

5. The storage medium of claim 1, comprising computer instructions to establish in the profile one or more alert options triggered by one or more event signals associated with the selected one or more subject matters of interest, wherein the one or more event signals are sourced by a third party source; wherein the one or more alert options comprise asserting a first alert signal at the terminal device, and at least one among transmitting a second alert signal to a communication device and transmitting a third alert signal to a multimedia device in the form of an Internet Protocol TV.

6. The storage medium of claim 5, wherein the first alert signal performs at least one among a group of tasks, and wherein the group of tasks comprise computer instructions to modify a GUI element corresponding to an alert option associated with the first alert signal, assert an audible alert, and assert a visual alert.

7. The storage medium of claim 5, wherein the multimedia device comprises an IP-TV device, wherein the communication device comprises one among a pager, a wireline phone, a wireless phone, and a computing device, and wherein the second alert signal corresponds to at least one among a page, a Short Message Service (SMS) message, an email, and a voice message.

8. The storage medium of claim 1, wherein the one or more subject matters of interest correspond to at least one among a group of subject matters comprising sports, news, weather, finances, business, health, entertainment, education, politics, law, science, and technology, and wherein the IRI comprises at least one among a domain name, the domain name and a corresponding port number, an IP address, and the IP address and a corresponding port number.

9. A terminal device, comprising a User Interface (UI) element to:
   link a Graphical User Interface (GUI) element to each Uniform Resource Identifier (URI) of one or more subject matters of interest defined in a profile based on a selection by an end user,
   present said one or more GUI elements in a GUI window without association to an Internet browser, wherein the UI element presents the profile with the one or more subject matters of interest without access to corresponding predefined URIs and without identifying corresponding content providers associated with the predefined URIs, and
   establish the profile of the one or more subject matters of interest in response to a selection made by the end user from the one or more subject matters of interest, wherein the selection is made without access to the corresponding content providers associated with the predefined URIs.

10. The terminal device of claim 9, wherein the UI element establishes in the profile one or more alert options triggered by one or more events associated with the one or more subject matters of interest, and wherein the one or more alert options comprise an assertion of a first alert signal at the terminal device, a transmission of a second alert signal to a communication device, and a transmission of a third alert signal to multimedia device.

11. The terminal device of claim 10, wherein the first alert signal performs at least one among a group of tasks comprising modifying a GUI element corresponding to an alert option associated with the first alert signal, asserting an audible alert, and asserting a visual alert.

12. The terminal device of claim 10, wherein the multimedia device comprises an IP-TV device, wherein the communication device comprises one among a pager, a wireline phone, a wireless phone, and a computing device, and wherein the second alert signal corresponds to at least one among a page, a Short Message Service (SMS) message, an email, and a voice message.

13. The terminal device of claim 9, wherein each of the corresponding content providers is determined based on a pre-existing agreement to provide content for at least a portion of the one or more subject matters of interest, wherein the pre-existing agreement is between the corresponding content provider and a communication service provider of the terminal device.

14. The terminal device of claim 9, wherein the UI element presents a location field with the profile, identifies location data supplied by the end user in the location field, and selects the plurality of subject matters of interest according to the location data supplied by the end user.

15. A method in a terminal device, comprising:
   presenting at the terminal device a plurality of subject matters of interest without access to corresponding predefined Uniform Resource Locators (URLs) and without identifying corresponding content providers associated with the predefined URLs;
   establishing in a profile one or more subject matters of interest selected by an end user from the plurality of subject matters of interest;
   linking a Graphical User Interface (GUI) element to each predefined URL of the one or more subject matters of interest selected; and
   presenting said one or more GUI elements in a GUI window without association to an Internet browser.

16. The method of claim 15, comprising establishing in the profile one or more alert options triggered by one or more events associated with the one or more subject matters of interest.

17. The method of claim 16, wherein the one or more alert options comprise asserting a first alert signal at the terminal device, transmitting a second alert signal to a communication device, and transmitting a third alert signal to multimedia device.

18. The method of claim 16, comprising:
   presenting through the one or more GUI elements a portion of Internet content associated with the corresponding URL of said GUI elements; and
   presenting a GUI window in response to a selection of the one or more GUI elements with full access to the Internet content associated with the URL of the selected GUI element.

19. The method of claim 15, comprising presenting said one or more GUI elements in the GUI window without identifying the corresponding content providers and the predefined URLs.

20. The method of claim 15, wherein each of the corresponding content providers is determined based on a pre-existing agreement to provide content for at least a portion of subject matters of interest from the plurality of subject matters of interest, wherein the pre-existing agreement is between the corresponding content provider and a communication service provider of the terminal device.

* * * * *